United States Patent
Okada

(10) Patent No.: US 8,614,810 B2
(45) Date of Patent: Dec. 24, 2013

(54) SCANNER

(75) Inventor: Aya Okada, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 1020 days.

(21) Appl. No.: 12/382,346

(22) Filed: Mar. 13, 2009

(65) Prior Publication Data

US 2009/0231635 A1    Sep. 17, 2009

(30) Foreign Application Priority Data

Mar. 14, 2008    (JP) ............................... P2008-065920

(51) Int. Cl.
*G06F 3/13*    (2006.01)
*G06F 3/12*    (2006.01)

(52) U.S. Cl.
USPC ........ 358/1.15; 358/1.13; 358/1.14; 358/403; 358/444; 382/305; 382/306

(58) Field of Classification Search
USPC ........................................................ 358/1.15
See application file for complete search history.

(56) References Cited

U.S. PATENT DOCUMENTS

| | | | | |
|---|---|---|---|---|
| 6,781,823 B1* | 8/2004 | Nyack | ....................... | 361/679.29 |
| 2004/0136022 A1* | 7/2004 | Kizaki et al. | ................. | 358/1.13 |
| 2005/0111032 A1* | 5/2005 | Lee et al. | ...................... | 358/1.15 |
| 2006/0232801 A1* | 10/2006 | Hoshii | ............................ | 358/1.9 |
| 2007/0121147 A1* | 5/2007 | Corona et al. | ............... | 358/1.15 |

FOREIGN PATENT DOCUMENTS

| | | |
|---|---|---|
| JP | 8214165 | 8/1996 |
| JP | 9080733 | 3/1997 |
| JP | 11-215273 A | 8/1999 |
| JP | 2005064656 | 3/2005 |
| JP | 2006-166365 A | 6/2006 |
| JP | 2008-015415 A | 1/2008 |

* cited by examiner

*Primary Examiner* — Huo Long Chen
(74) *Attorney, Agent, or Firm* — Nath, Goldberg & Meyer; Jerald L. Meyer; Sanjana Manalagiri

(57) ABSTRACT

A scanner includes: an image data input unit to which an image data from a generating source is inputted; a generating source identification unit configured to identify the generating source of the image data inputted to the image data input unit; a selection unit configured to select an image forming apparatus to which the inputted image data is to be outputted from among a plurality of image forming apparatuses serving as output destinations to which the image data is capable of being outputted on the basis of the generating source identified by the generating source identification unit; and a converted data output unit configured to convert the image data inputted to the image data input unit into data having contents suitable for an output condition for an image of the image forming apparatus selected by the selection unit and to output the converted image data to the image forming apparatus selected by the selection unit.

7 Claims, 5 Drawing Sheets

FIG. 3

| GENERATING SOURCE | CHARACTERISTICS | OUTPUT DESTINATION |
|---|---|---|
| FAX UNIT | REQUIRING NO SO GOOD IMAGE QUALITY | FIRST PRINTER |
| FIRST AND SECOND SCANNERS | REQUIRING GOOD IMAGE QUALITY | SECOND PRINTER |
| PERSONAL COMPUTER | REQUIRING HIGH-SPEED AND LARGE-VOLUME PRINTING | THIRD PRINTER |

FIG. 4

| PRINTING CONDITION | CHARACTERISTICS | IMAGE PROCESSING |
|---|---|---|
| PRINTER : FIRST PRINTER<br>LOADED PAPER SHEETS : ORDINARY PAPER | INK IS LIKELY TO SPREAD ON PAPER | EMPLOY SIX-LEVEL GRADATION (SET MAXIMUM NUMBER OF DROPS TO 5) |
| PRINTER : FIRST PRINTER<br>LOADED PAPER SHEETS : IJ SPECIFIC PAPER | INK IS LESS LIKELY TO SPREAD ON PAPER | EMPLOY EIGHT-LEVEL GRADATION (SET MAXIMUM NUMBER OF DROPS TO 7) |
| PRINTER : FIRST PRINTER<br>LOADED PAPER SHEETS : RECYCLED PAPER | INK IS HIGHLY LIKELY TO SPREAD ON PAPER | EMPLOY FOUR-LEVEL GRADATION (SET MAXIMUM NUMBER OF DROPS TO 3) |
| PRINTER : FIRST PRINTER<br>USED INK : OIL-BASED INK | PRINTED IMAGE IS PRONE TO BE TOO STRONG IN YELLOW | PERFORM GRADATION CONVERSION SUITABLE FOR OIL-BASED INK (GRADATION CONVERSION FOR LIGHTENING YELLOW) |
| PRINTER : FIRST PRINTER<br>USED INK : WATER-BASED INK | PRINTED IMAGE IS PRONE TO BE TOO STRONG IN MAGENTA | PERFORM GRADATION CONVERSION SUITABLE FOR WATER-BASED INK (GRADATION CONVERSION FOR LIGHTENING MAGENTA) |
| PRINTER : FIRST PRINTER | PRINTED IMAGE APPEARS AS VERY SOFT IMAGE | INCREASE CONTRAST TO GREAT EXTENT |
| PRINTER : SECOND PRINTER | PRINTED IMAGE APPEARS AS SHARP IMAGE | REDUCE CONTRAST |
| PRINTER : THIRD PRINTER | PRINTED IMAGE APPEARS AS SOFT IMAGE | INCREASE CONTRAST |

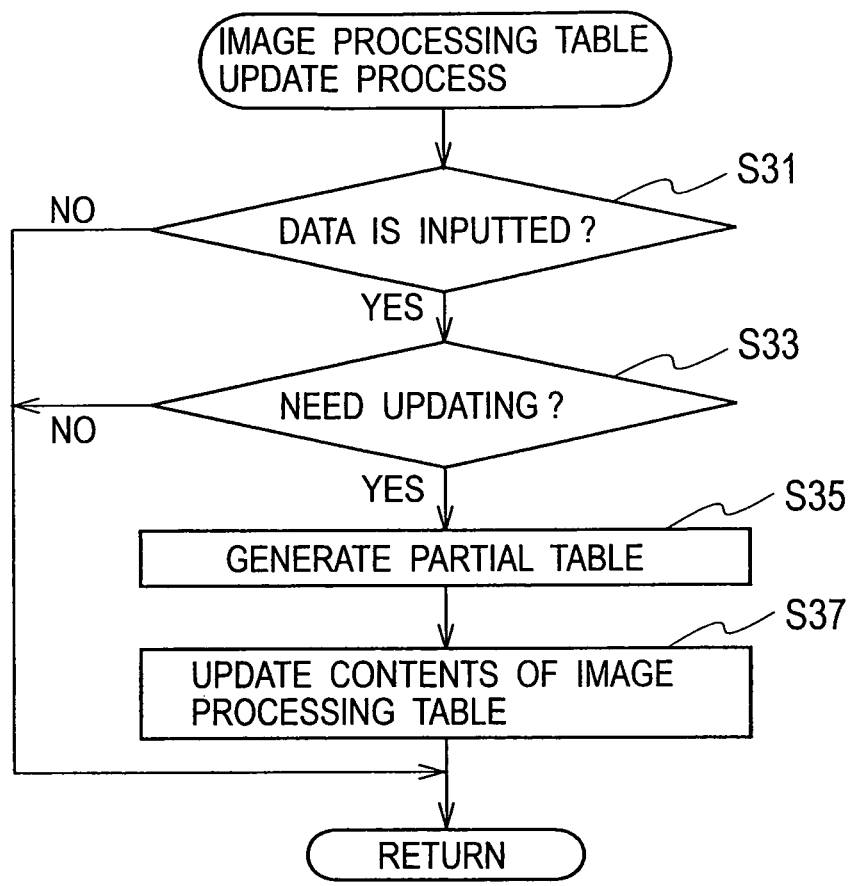

SCANNER

CROSS REFERENCE TO RELATED APPLICATION

This application is based upon and claims the benefit of priority from the prior Japanese Patent Application No. 2008-065920, filed on Mar. 14, 2008, the entire contents of which are incorporated herein by reference.

BACKGROUND OF THE INVENTION

1. Field of the Invention

The present invention relates to a scanner configured to output scanned image data to an image forming apparatus, especially to a scanner configured to convert scanned image data into data having contents suitable for an image output condition of an image forming apparatus serving as an output destination, and then output the converted (resultant) image data to the image forming apparatus.

2. Description of the Related Art

In some cases, a scanner machine configured to scan an image from an original and to output the image data is connected to a network such as LAN and selectively outputs image data to one of multiple image forming apparatuses (such as printers) on the network.

With this background, Japanese Patent No. 3797559, Japanese Patent No. 3595389 and Japanese Patent No. 2660170 each propose a scanner machine configured to convert image data scanned by itself into data having contents suitable for a certain (particular) one of different image output conditions respectively of image forming apparatuses serving as output destinations, and output the resultant data. Specifically, under the image output conditions, the respective image forming apparatuses perform outputting (printing or the like) of images.

As described above, each of the above related scanner machines has a configuration for converting image data into data having contents suitable for the image output condition of a selected one of the image forming apparatuses serving as output destinations. However, each of the related scanner machines allows the configuration to be used only in outputting image data scanned by itself to any of the image forming apparatuses.

SUMMARY OF THE INVENTION

The present invention has been made in consideration of the above problem. An object of the present invention is to provide a scanner allowing effective utilization of a configuration for converting image data into data having contents suitable for an image output condition of a selected one of the image forming apparatuses serving as output destinations, specifically, allowing the configuration to be used not only in outputting image data scanned by itself to any of the image forming apparatuses but also for other purposes.

To achieve the above object, an aspect of the present invention is a scanner that converts an image data scanned by the scanner into a data having contents suitable for an output condition of a particular image forming apparatus to which the scanned image data is to be outputted among output conditions for an image respectively of a plurality of image forming apparatuses serving as output destinations to which the scanned image data is capable of being outputted; and outputs the converted scanned image data to the particular image forming apparatus, the scanner comprising: an image data input unit to which an image data from a generating source is inputted; a generating source identification unit configured to identify the generating source of the image data inputted to the image data input unit; a selection unit configured to select an image forming apparatus to which the inputted image data is to be outputted from among the plurality of the image forming apparatuses serving as the output destinations on the basis of the generating source identified by the generating source identification unit; and a converted data output unit configured to convert the image data inputted to the image data input unit into data having contents suitable for the output condition of the image forming apparatus selected by the selection unit and to output the converted image data to the image forming apparatus selected by the selection unit.

According to the aspect, if image data is inputted to the image data input unit, the generating source identification unit identifies the generating source of the image data. Then, based on the generating source thus identified, the selection unit selects a certain image forming apparatus to which the inputted image data is to be outputted. In response, the converted data output unit converts the image data into data having contents suitable for an output condition under which the certain image forming apparatus outputs an image, and outputs the resultant image data to the certain image forming apparatus.

Thus, this aspect allows the scanner to output scanned image data to a certain one of image forming apparatuses serving as output destinations by using the configuration for converting image data scanned by itself into data having contents suitable for an image output condition of the certain image forming apparatus also for conversion of contents of image data inputted to the image data input unit. Hence, the aspect enables effective utilization of the configuration for such conversion.

Moreover, the selection unit selects the certain image forming apparatus, that is, the output destination of the image data having converted contents, on the basis of the generating source of the image data. Thus, in such a case that each generating source has characteristics affecting properties of generated image data, it is possible to cause the selection unit to select an image forming apparatus to output an image under an output condition suitable for the characteristics. Thereby, the scanner can output an image under conditions, such as quality and speed, closer to those required for outputting the image.

The scanner may further comprise an input/output table storage configured to store therein an input/output correspondence table associating each candidate for the generating source of the image data to be inputted to the image data input unit with an image forming apparatus to which the image data inputted to the image data input unit is to be outputted among the plurality of the image forming apparatuses serving as the output destinations, wherein the selection unit selects, as an image forming apparatus to which the inputted image data is to be outputted, the image forming apparatus associated with the generating source identified by the generating source identification unit in the input/output correspondence table.

With this configuration, the selection unit selects a certain image forming apparatus based on the generating source identified by the generating source identification unit by referring to the input/output correspondence table stored in the input/output table storage unit.

The input/output correspondence table stored in the input/output table storage unit can be updated every time any change is made in a lineup of generating sources allowed by the image data input unit to input image data thereto or a lineup of image forming apparatuses capable of receiving image data outputted by the converted data output unit and outputting an image based on the data. This means that the scanner has a configuration that facilitates provision of conditions allowing the selection unit to always select an image forming apparatus which outputs an image under an output condition suitable for characteristics of the generating source of the image data and the like.

The scanner may further comprise a conversion content table storage configured to store therein a conversion content correspondence table associating each of the output conditions respectively of the plurality of the image forming apparatuses serving as the output destinations with a conversion content for converting the image data in accordance with each of the output conditions, wherein the converted data output unit converts the image data by implementing the conversion content associated with the output condition of the image forming apparatus selected by the selection unit in the conversion content correspondence table.

With this configuration, the converted data output unit convert the image data inputted to the image data input unit into data having contents suitably set for the image output condition of a certain image forming apparatus by referring to the conversion content correspondence table stored in the conversion content table storage unit.

The conversion content correspondence table stored in the conversion content table storage unit can be updated every time any change is made in a lineup of image forming apparatuses capable of receiving image data outputted by the converted data output unit and outputting an image based on the data. This means that the scanner has a configuration that facilitates provision of conditions allowing the converted data output unit to always perform, on the image data inputted to the image data input unit, conversion processing having contents suitably set for the output condition of the certain image forming apparatus.

The scanner may further comprise a conversion content table update unit configured to update the conversion content correspondence table on the basis of data on the output condition outputted by any of the image forming apparatuses.

With this configuration, upon any change is made in a lineup of image forming apparatuses capable of receiving image data outputted by the converted data output unit and outputting an image based on the data, the contents defined, in association with the change, in the conversion content correspondence table stored in the conversion content table storage unit can be promptly updated.

BRIEF DESCRIPTION OF THE DRAWINGS

FIG. 3 illustrates an example of contents of an input/output correspondence table stored in an external memory shown in FIG. 2.

FIG. 4 illustrates an example of contents of an image processing table stored in an external memory shown in FIG. 2.

FIG. 7 is a flowchart showing a processing procedure that the program stored in the ROM causes the CPU of the control unit shown in FIG. 2 to perform.

DETAILED DESCRIPTION OF THE EMBODIMENT

Hereinafter, an embodiment of the present invention will be described with reference to the drawings. In the following description based on the drawings, the same or similar parts are denoted by the same or similar reference symbols.

Figure 1:
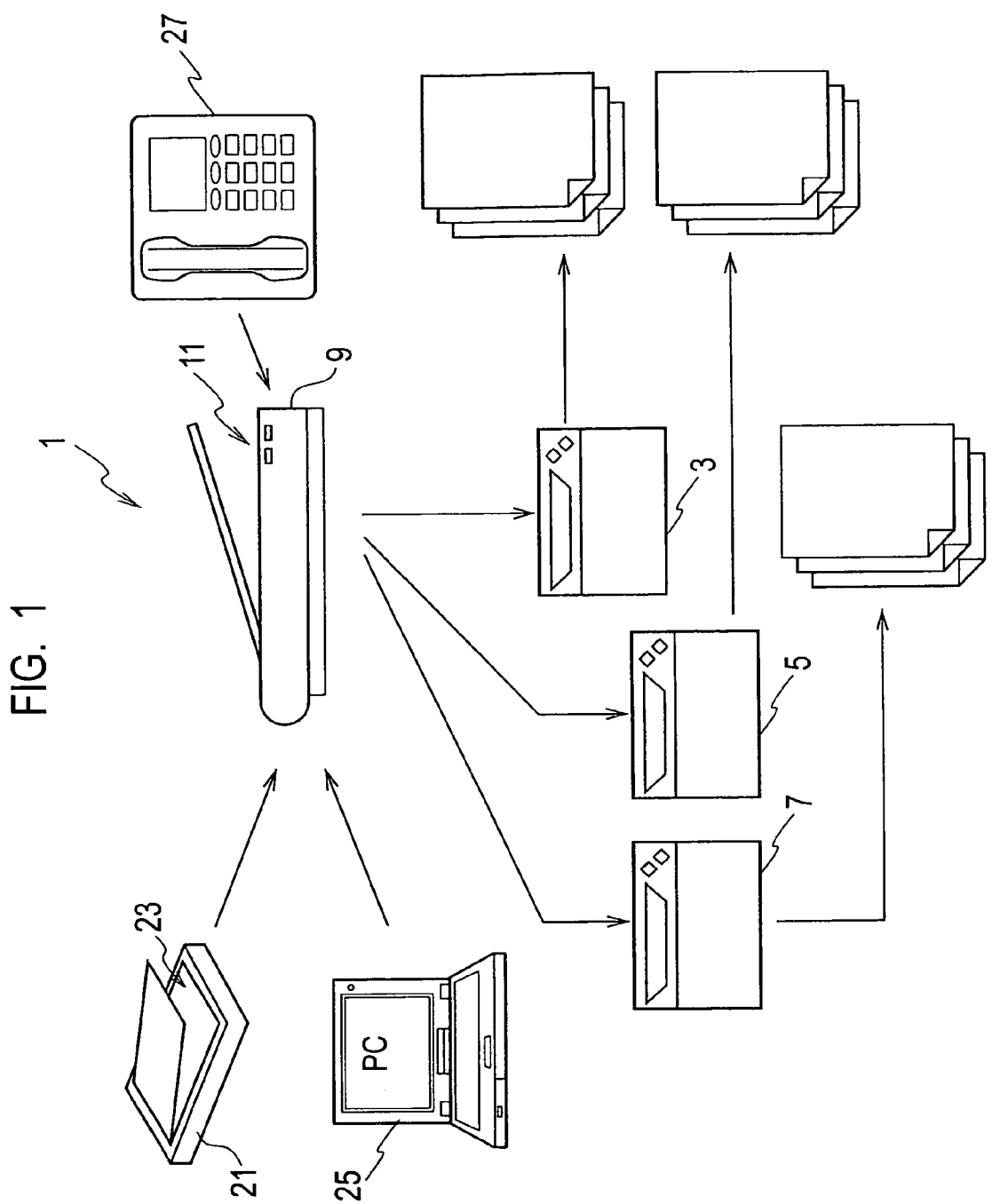
FIG. 1 illustrates an outline configuration of an image printing system using a scanner according to an embodiment of the present invention.
Figure 2:
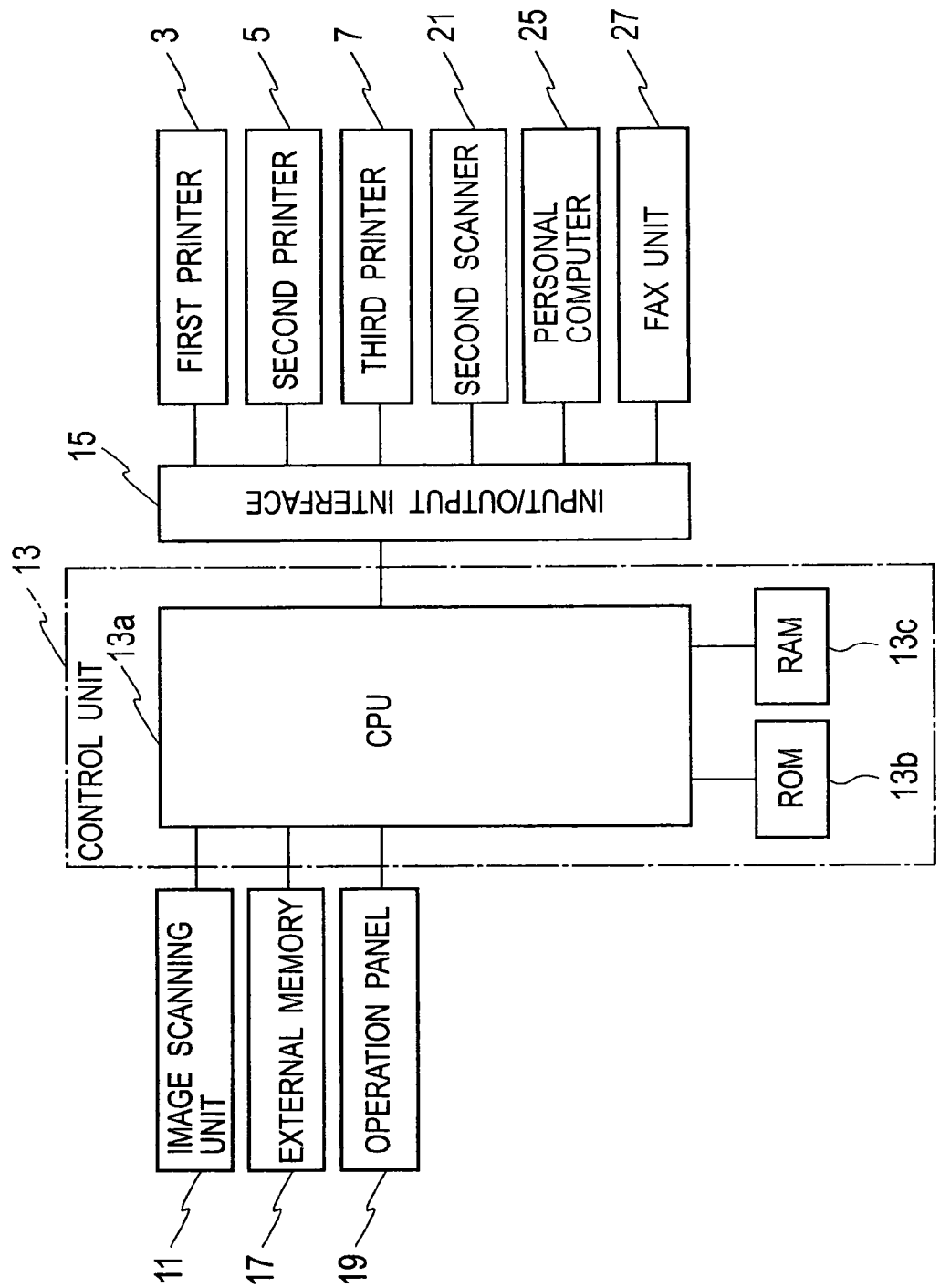
FIG. 2 is a block diagram of an outline electrical configuration of the scanner shown in FIG. 1.

FIG. 1 illustrates an outline configuration of an image printing system using a scanner according to an embodiment of the present invention. FIG. 2 is a block diagram of an outline electrical configuration of the scanner shown in FIG. 1.

The image printing system 1 shown in FIG. 1 is configured to print an image on a recording paper by using a printer appropriately selected from first to third printers 3, 5 and 7, which are an ink-jet printer, a laser-beam printer and a stencil printer, respectively. In the image printing system 1, the first to third printers 3, 5 and 7 (image forming apparatuses) are connected to a first scanner 9 (scanner). With this configuration, the image printing system 1 can cause a selected one of the first to third printers 3, 5 and 7 to print an image scanned from an original by an image scanning unit 11 of the first scanner 9.

To the first scanner 9, a second scanner 21, a personal computer 25 and a FAX unit 27 are connected. The second scanner 21 is configured to cause an image scanning unit 23 to scan an image data from an original, and output the image data to the first scanner 9. The personal computer 25 is configured to generate an image data by using application software and the like, and output the image data to the first scanner 9. The FAX unit 27 is configured to receive an FAX image signal (data) through a telephone network, cause an inner FAX modem (not shown) to convert the FAX image signal into a digital signal, and output the digital signal to the first scanner 9.

The image printing system 1 according to this embodiment can output an image data from any of the second scanner 21, the personal computer 25 and the FAX unit 27 (generating sources of the image data) to a selected one of the first to third printers 3, 5 and 7 through the first scanner 9, and cause the selected one of the first to third printers 3, 5 and 7 to print an image based on this data.

Hereinbelow, with reference to FIG. 2, description will be given of an electrical configuration of the first scanner 9, which is configured to implement the aforementioned function of the image printing system 1.

The first scanner 9 includes a control unit 13, an input/output interface 15, an external memory 17 and an operation panel 19 in addition to the image scanning unit 11 described above. The control unit 13 includes a CPU 13a, a ROM 13b and a RAM 13c.

To the CPU 13a, the ROM 13b, the RAM 13c, the image scanning unit 11, the input/output interface 15, the external memory 17 and the operation panel 19 described above are connected. Moreover, to the CPU 13a, the first to third printers 3, 5 and 7, the second scanner 21, the personal computer 25 and the FAX unit 27 are connected via the input/output interface 15. The ROM 13b stores therein a control program for causing the CPU 13a to perform various processing operations. The RAM 13c has a data area for storing various data and a work area used for various processing works.

In the external memory 17, generating sources of image data to be inputted and output destinations of inputted image data (apparatuses to print out images based on the data) are registered (stored). Specifically, as the image data generating sources, the second scanner 21, the personal computer 25 and the FAX unit 27, which are connected to the CPU 13a via the input/output interface 15, are registered. As the image data output destinations, the first to third printers 3, 5 and 7, which are connected to the CPU 13a via the input/output interface 15, are registered.

In addition, the external memory 17 also stores therein an input/output correspondence table, an image processing table and data conversion information. The input/output correspondence table associates the registered image data generating sources with the registered image data output destinations. The image processing table associates each of the registered image data output destinations with image processing contents for image data to be outputted to the output destination. Based on the data conversion information, image data inputted by the generating sources are converted into a data format available as inputs to the output destinations.

The input/output correspondence table defines which of the image data output destinations registered in the external memory 17 to select as a printer to output image data generated by each of the image data generating sources registered in the external memory 17. Specifically, the printer to output image data, that is, printer to print an image based on the data is defined in accordance with characteristics of the image.

In this embodiment, the input/output correspondence table includes, as image data generating sources, not only the second scanner 21, the personal computer 25 and the FAX unit 27, which are registered in the external memory 17, but also the first scanner 9 itself, in which the CPU 13a generates image data scanned from an original by the image scanning unit 11. Specifically, the input/output correspondence table also defines which printer to select as an output destination of image data generated by the first scanner 9.

As shown in FIG. 3, in the input/output correspondence table of this embodiment, the first to third printers 3, 5 and 7 (certain image forming apparatuses) are defined as image data output destinations associated with the image data generating sources as follows. Specifically, the first printer 3, which is an ink-jet printer, is defined as an output destination of an image data generated by the FAX unit 27, an image data generating source characterized by requiring not so good image printing quality. The second printer 5, which is a laser-beam printer, is defined as an output destination of an image data generated by any of the first and second scanners 9 and 21, image data generating sources characterized by requiring good image printing quality. The third printer 7, which is a stencil printer, is defined as an output destination of an image data generated by the personal computer 25, an image data generating source characterized by requiring high-speed and large-volume printing.

The image processing table (conversion content correspondence table) defines contents of image processing to be performed on image data before the image data is outputted to each of the output destinations registered in the external memory 17. Specifically, as the image processing contents, defined is how to convert image data in order to allow each output destination to print (output) an image based on the data while satisfying a printing condition (output condition) of the output destination.

In this embodiment, as in the image processing table shown in FIG. 4, a printing condition for the first printer 3, an ink-jet printer, includes: types of recording paper sheets loaded therein (ordinary paper, ink-jet (IJ) specific paper and recycled paper); and types of inks used in the first printer 3 (oil-based ink and water-based ink).

The second printer 5 and the third printer 7, which are a laser-beam printer and a stencil printer, respectively, have the printing conditions which do not depend on the types of recording paper sheets loaded therein at all, and use toners or inks having no distinctive types. Accordingly, each of the second and third printers 5 and 7 is associated with a single image processing content set.

Accordingly, in the image processing table, which type of recording paper sheets are loaded in the first printer 3, an ink-jet printer, and which types of inks are used in the first printer 3 are respectively associated with content sets of gradation processing to be performed on an image data. Here, the types of recording paper sheets are ordinary paper, ink-jet (IJ) specific paper and recycled paper while the types of inks are oil-based ink and water-based ink, as described above.

Specifically, in the image processing table of this embodiment, six-level gradation processing (the maximum number of drops is 5) is associated with the case where recording paper sheets loaded in the first printer 3 are ordinary paper, which is characterized in that ink thereon is likely to spread. Meanwhile, eight-level gradation processing (the maximum number of drops is 7) is associated with the case where recording paper sheets loaded in the first printer 3 are IJ specific paper, which is characterized in that ink thereon is less likely to spread. On the other hand, four-level gradation processing (the maximum number of drops is 3) is associated with the case where recording paper sheets loaded in the first printer 3 are recycled paper, which is characterized in that ink thereon is very likely to spread.

Meanwhile, gradation processing for lightening yellow (Y) in data conversion is associated with the case where inks used in the first printer 3 are oil-based ink, which is characterized in that an image printed on a recording paper therewith is prone to be too strong in yellow. On the other hand, gradation processing for lightening magenta (M) in data conversion is associated with the case where inks used in the first printer 3 are water-based ink, which is characterized in that an image printed on a recording paper therewith is prone to be too strong in magenta.

In addition to these, in the image processing table of this embodiment, gradation processing for increasing contrast to a great extent is associated with the first printer 3, an ink-jet printer, which is characterized in that an image printed on a recording paper therewith is prone to appear as a very soft image. Gradation processing for reducing contrast is associated with the second printer 5, a laser-beam printer, which is characterized in that an image printed on a recording paper therewith is prone to appear as a sharp image. Gradation processing for increasing contrast is associated with the third printer 7, a stencil printer, which is characterized in that an image printed on a recording paper therewith is prone to appear as a soft image.

In the image processing table of this embodiment, the gradation processing contents corresponding to each type of recording paper sheets and inks used in the first printer 3 need to be updated accordingly upon change in type of recording paper sheets and inks actually used in the first printer 3. Thus, in the image printing system 1 of this embodiment, the first printer 3 periodically outputs, to the first scanner 9, data (data on output conditions) indicating currently-used types of recording paper sheets and inks. Upon receipt of the data, the CPU 13a of the first scanner 9, if needed, updates the corresponding contents of the image processing table in the external memory 17 by overwriting the contents with the new contents based on the data.

Note that characteristics of various types of recording paper sheets and inks used in the first printer 3 included in the input/output correspondence table of FIG. 3 and the image processing table of FIG. 4 are described in order to conveniently facilitate understanding of details of these tables. Hence, such characteristics are neither essential for the tables, nor limited to those included in FIGS. 3 and 4.

For example, the image processing table in FIG. 4 defines the gradation processing contents for each of the following cases: where recording paper sheets loaded in the first printer 3 are ordinary paper; where the recording paper sheets are IJ specific paper; where the recording paper sheets are recycled paper; where inks used in the first printer 3 are oil-based ink; and where the inks are water-based ink. However, the gradation processing contents for the case associated with any type of recording paper sheets or inks that is not actually used in the first printer 3 may be omitted from the image processing table. The following description will be given under the assumption that the image processing table in the external memory 17 defines only the gradation processing contents for the cases associated with types of recording paper sheets and inks actually used in the first printer 3.

The data conversion information is logic information for converting RGB (red, green and blue) color data into a CMYK (cyan, magenta, yellow and black) color data format, which is available as inputs to the first to third printers 3, 5 and 7. Here, the RGB color data may be derived from an image scanned from an original by the image scanning unit 11 or an image inputted to the CPU 13a by any of the second scanner 21, the personal computer 25 and the FAX unit 27.

In this embodiment, the external memory 17 stores therein different data conversion information sets for the first to third printers 3, 5 and 7, respectively, so as to allow contents of RGB-to-CMYK data format conversion to be individually defined for each of the first to third printers 3, 5 and 7.

The data conversion information may also include logic information necessary for performing, on image data, gradation processing having the contents defined in the image processing table.

The operation panel 19 may consist of a display capable of displaying variable contents and a touch panel for detecting user operations which covers a display surface of the display. The display of the operation panel 19 can display a screen showing the current operational state of the first scanner 9 and a screen allowing users to enter various inputs by touch operations. The touch panel can detect touch operations that users made on the input screen displayed on the display, and output, to the CPU 13a, a signal indicating the contents of the users' operations.

Hereinafter, with reference to flowcharts shown in FIGS. 5 to 7, description will be given of a processing procedure that the control program stored in the ROM 13b causes the CPU 13a to perform. Specifically, the CPU 13a performs the processing to cause any of the first to third printers 3, 5 and 7 to print, on a recording paper sheet, an image based on data that any of the second scanner 21, the personal computer 25 and the FAX unit 27 inputs to the CPU 13a, or an image scanned from an original by the image scanning unit 11 of the first scanner 9.

Figure 5:
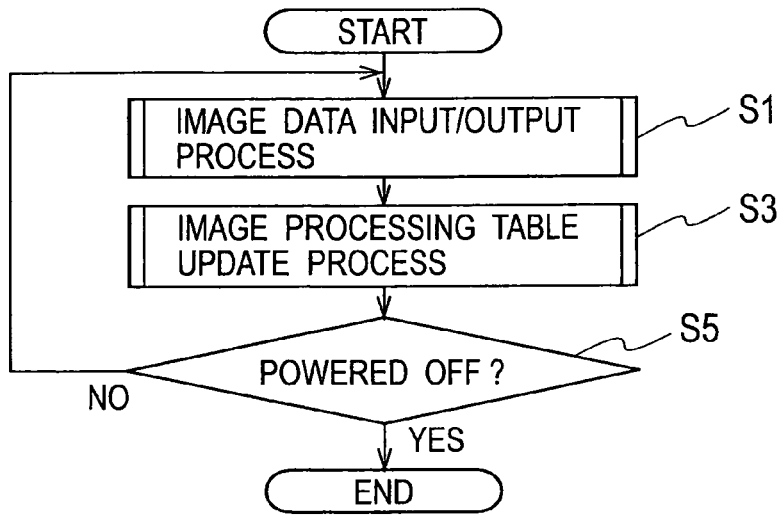
FIG. 5 is a flowchart showing a processing procedure that a program stored in a ROM causes a CPU of a control unit shown in FIG. 2 to perform.

After the first scanner 9 is powered on, the CPU 13a iteratively performs an image data input/output process of step S1 and an image processing table update process of step S3 till determining in step S5 that the first scanner 9 is powered off, as shown in the main routine flowchart in FIG. 5.

Figure 6:
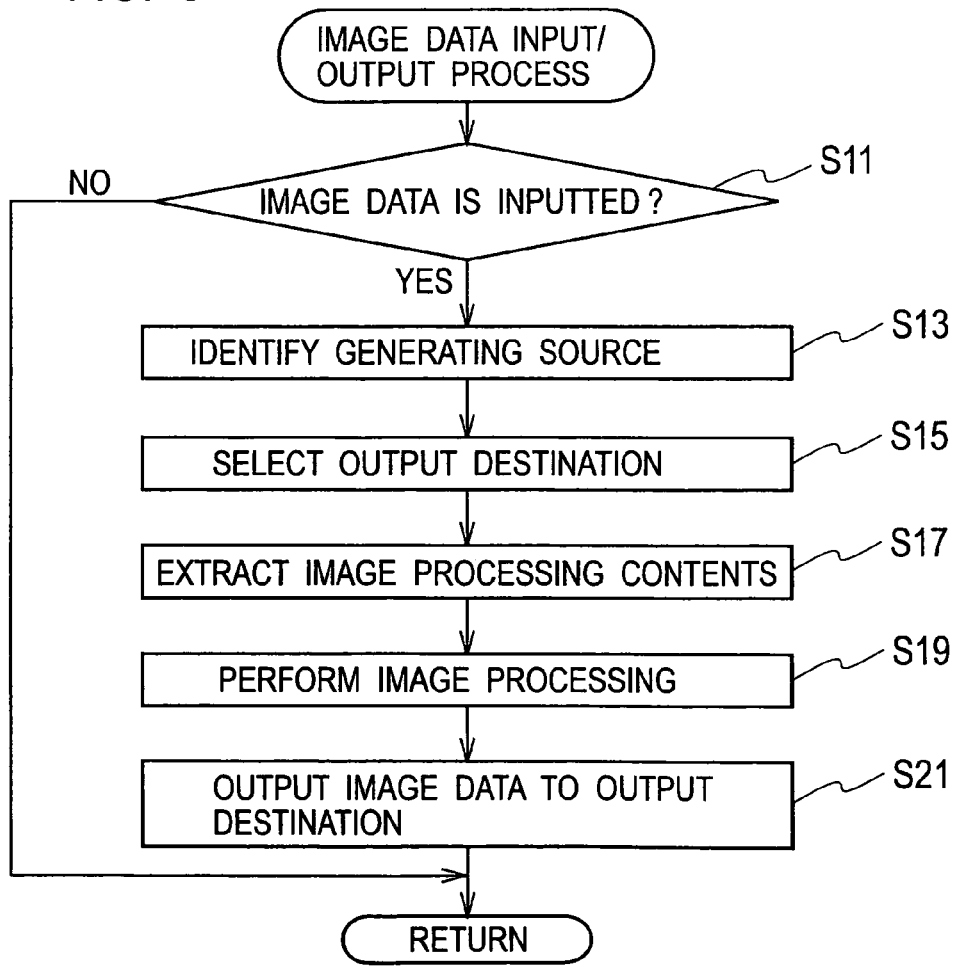
FIG. 6 is a flowchart showing a processing procedure that the program stored in the ROM causes the CPU of the control unit shown in FIG. 2 to perform.

The CPU 13a performs the image data input/output process of step S1 as shown in the subroutine flow chart in FIG. 6. Firstly, the CPU 13a determines whether or not image data is inputted either via the input/output interface 15 or by the image scanning unit 11 (step S1). If no image data is inputted (NO in step S11), the CPU 13a ends the image data input/output process. If any image data is inputted (YES in step S11), the CPU 13a identifies the output source (generating source) of the inputted image data (step S13) (the process is performed by a generating source identification unit).

The output source (generating source) of the inputted image data can be identified based on whether or not the image data is inputted by the image scanning unit 11 and, if not, which port of the input/output interface 15 the image data is inputted into among ports to which the second scanner 21, the personal computer 25 and the FAX unit 2 are respectively connected.

Then, the CPU 13a selects the image data output destination associated with the image data output source (generating source) identified in step S13 by referring to the input/output correspondence table in the external memory 17 (an input/output table storage unit and a conversion content table storage unit) (step S15) (the process is performed by a selection unit). Thereafter, the CPU 13a extracts the image processing contents for the selected output destination (any of the first to third printers 3, 5 and 7) defined in the image processing table in the external memory 17 (step S17) (the process is performed by a converted data output unit).

Then, the CPU 13a performs image processing having the contents extracted in step S17 on image data inputted in step S11 (step S19) (the process is performed by the converted data output unit), and outputs the image data subjected to the image processing to the output destination selected in step S15 via the input/output interface 15 (step S21) (the process is performed by converted data output unit). After that, the CPU 13a ends the image data input/output process.

Then, the CPU 13a performs the image processing table update process of step S3 in FIG. 5 as shown in the sub routine flowchart in FIG. 7. Firstly, the CPU 13a determines whether or not the first printer 3 inputs thereto data indicating currently-used types of recording paper sheets and inks via the input/output interface 15 (step S31). If no such data is inputted (NO in step S31), the CPU 13a ends the image processing table update process. If any such data is inputted (YES in step S31), the CPU 13a determines, based on the inputted data, whether to update the gradation processing contents for the first printer 3 in the image processing table in the external memory 17 (step S33).

Whether to update the gradation processing contents for the first printer 3 in the image processing table can be determined based on consistency of the contents indicated by data inputted by the first printer 3 via the input/output interface 15 and the corresponding contents currently defined in the image processing table in the external memory 17. Here, the data inputted by the first printer 3 indicates the types of recording paper sheets and inks currently used in the first printer 3 as described above, while the image processing table, as the corresponding contents, defines types of recording paper sheets and inks used in the first printer 3 in association with gradation processing.

If the gradation processing contents for the first printer 3 in the image processing table in the external memory 17 does not need updating (NO in step S33), the CPU 13a ends the image processing table update process. If these gradation processing contents need updating (YES in step S33), based on the data indicating the currently-used types of recording paper sheets and inks inputted by the first printer 3 in step S31, the CPU 13a generates a partial table that associates the currently-used types of recording paper sheets and inks with gradation processing contents suitably set for the types (step S35) (the process is performed by a conversion content table update unit).

Then, the CPU 13a updates the contents of the image processing table by over writing, with the partial table generated in step S35, a part that defines the types of recording paper sheets and inks used in the first printer 3 and the gradation processing contents associated with the types in the image processing table in the external memory 17 (step S37) (the process is performed by the conversion content table update unit). After that, the CPU 13a ends the image processing table update process.

As is clear from the above description, in this embodiment, an image data input unit is formed of the input/output interface 15 or the input/output interface 15 and the CPU 13a.

The first scanner 9 of this embodiment, which includes the CPU 13a that performs processing through the above procedure, outputs, to a selected one of the output destinations (any of the first to third printers 3, 5 and 7), image data including that inputted by an external source after performing thereon image processing (gradation processing and the like) having contents suitably set for the printing condition (output condition) under which the selected output destination prints (outputs) an image based on the data. Specifically, the image data that the first scanner 9 of this embodiment can output after the above image processing include not only image data scanned from an original by the image scanning unit 11 but also image data inputted by any of the second scanner 21, the personal computer 25 and the FAX unit 27 via the input/output interface 15.

This means that a configuration for performing image processing (gradation processing and the like) on image data scanned from an original by the image scanning unit 11 are made available for image processing (gradation processing and the like) for image data inputted by any of the second scanner 21, the personal computer 25 and the FAX unit 27 via the input/output interface 15, and thus means effective utilization of this configuration.

Moreover, the first scanner 9 of this embodiment selects an output destination of image-processed image data from the first to third printers 3, 5 and 7 based on which of the image scanning unit 11, the second scanner 21, the personal computer 25 and the FAX unit 27 generates this image data.

Accordingly, the first scanner 9 can select, from the first to third printers 3, 5 and 7, a printer to print an image based on data generated by each of the first scanner 9, the second scanner 21, the personal computer 25 and the FAX unit 27 while satisfying the printing condition suitable for characteristics (such as quality and speed required in printing) of the image. Thus, the first scanner 9 can cause the first to third printers 3, 5 and 7 to print an image under condition, such as quality and speed, closer to those required for printing the image.

Note that the input/output correspondence table used in selecting, based on the image data generating source, one printer as the output destination of data generated by the source, and the image processing table used in performing, on image data, image processing having the contents suitably set for the output condition of a printer selected as the output destination may be included in the control program stored in the ROM 13b.

However, if a configuration in which these tables are stored in the external memory 17 as in this embodiment is employed, these tables can be updated as needed. Thus, this configuration facilitates provision of: conditions allowing one of the data output destinations to be always selected based on the existing image data generating sources; and conditions allowing image processing having the contents suitably set for an existing printer selected as the output destination to be performed on image data.

Moreover, in this embodiment, the first printer 3 periodically outputs, to the first scanner 9, data indicating currently-used types of recording paper sheets and inks, and the first scanner 9 generates, based on the data, a new partial table necessary to update the image processing table in the external memory 17 and updates the image processing table by rewriting the partial table. However, the configuration for such rewriting and updating may be omitted. If this configuration is employed, the contents defined in association with the printing conditions of the first printer 3 in the image processing table can be promptly updated upon these printing conditions are changed. In addition, similar configuration for updating the image processing table with latest printing conditions for the second and third printers 5 and 7 (provided with printing conditions) may be employed as needed.

The scanner according to the embodiment of the present invention has been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiment of the present invention are only a list of optimum effects achieved by the present invention. Hence, the effects of the present invention are not limited to those described in the embodiment of the present invention.

What is claimed is:

1. A scanner comprising:

an image scanning unit configured to scan an original to generate image data;

an image data input unit to which an image data from a generating source is inputted, the generating source including the image scanning unit and an external generating source other than the image scanning unit;

a generating source identification unit configured to identify the generating source of the image data inputted to the image data input unit;

a selection unit configured to select an image forming apparatus to which the inputted image data is to be outputted from among a plurality of the image forming apparatuses serving as output destinations to which image data is capable of being outputted, on the basis of the generating source identified by the generating source identification unit;

a conversion content correspondence table storage configured to store therein a conversion content correspondence table associating each of output conditions respectively of the plurality of the image forming apparatuses with a conversion content for converting the image data in accordance with each of the output conditions, the conversion content correspondence table defining contents of image processing to be performed on image data based upon at least one of image gradation, image quality, ink type, print speed, paper and color before the image data is outputted to each of the image forming apparatuses;

a converted data output unit configured to convert the image data inputted to the image data input unit by implementing the conversion content associated with the output condition of the image forming apparatus selected by the selection unit in the conversion content correspondence table and to output the converted image data to the image forming apparatus selected by the selection unit;

an input/output table storage configured to store therein an input/output correspondence table associating each candidate for the generating source of the image data to be inputted to the image data input unit with an image forming apparatus to which the image data inputted to the image data input unit is to be outputted among the plurality of the image forming apparatuses serving as the output destinations, wherein the selection unit selects, as an image forming apparatus to which the inputted image data is to be outputted, the image forming apparatus associated with the generating source identified by the generating source identification unit in the input/output correspondence table, and wherein the input/output correspondence table associates the respective generating sources having characteristics including at least one of a condition of image quality or a condition of printing speed with the image forming apparatus being capable of outputting image data so as to satisfy the characteristics of the respective generating sources.

2. The scanner according to claim 1, further comprising a conversion content table update unit configured to update the conversion content correspondence table on the basis of data on the output condition outputted by any of the image forming apparatuses.

3. The scanner according to claim 1, wherein:
the converted data output unit converts the image data into data having contents suitable for the output condition of the particular image forming apparatus selected by the selection unit to allow each output destination to output an image based on the data while satisfying an output condition of the output destination, and in different data conversion sets for different types of the output destinations, the data conversion information comprising logic information for converting RGB (red, green and blue) color data into a CMYK (cyan, magenta, yellow and black) color data format, is provided in said different data conversion sets for different types of the output destinations.

4. The scanner according to claim 1, wherein:
the correspondence table defines contents of image processing before outputting the image data to each of the output destinations as image processing data, the image processing data indicating how to convert image data in order to allow each output destination to print or output an image based on the data while satisfying a printing condition or output condition of that output destination, and the data conversion information also includes logic information for performing, on image data, gradation processing having the contents defined in the input/output correspondence table.

5. The scanner according to claim 1, wherein the conversion content for converting the image data includes a content of gradation processing to be performed on the image data.

6. The scanner according to claim 1, wherein the output conditions include at least one of types of recording paper sheets or types of ink used for outputting image data in the plurality of the image forming apparatuses respectively.

7. The scanner according to claim 1, wherein the image data inputted from the generating source is converted into a data format available as an input to the selected image forming apparatus based on the data conversion information.

* * * * *